US008196383B2

(12) United States Patent
Van Beek

(10) Patent No.: US 8,196,383 B2
(45) Date of Patent: Jun. 12, 2012

(54) DEVICE FOR STRIPPING THE LEAVES FROM HEADING PLANTS GROWN IN ROWS

(75) Inventor: Cornelius Johannes Maria Van Beek, Dongen (NL)

(73) Assignee: Ploeger Agro B.V., Oud Gastel (NL)

(*) Notice: Subject to any disclaimer, the term of this patent is extended or adjusted under 35 U.S.C. 154(b) by 0 days.

(21) Appl. No.: 12/949,338

(22) Filed: Nov. 18, 2010

(65) Prior Publication Data

US 2011/0120074 A1    May 26, 2011

(30) Foreign Application Priority Data

Nov. 26, 2009 (NL) .................................. 1037503

(51) Int. Cl.
*A01D 45/00* (2006.01)
(52) U.S. Cl. ...................................................... 56/327.1
(58) Field of Classification Search ................... 56/13.5, 56/14.1–14.3, 103–105, 109, 110, 119, 327.1, 56/330, 27.5; 47/1.43; 460/134, 135, 140; 131/290, 314, 315, 321, 323
See application file for complete search history.

(56) References Cited

U.S. PATENT DOCUMENTS

| | | | | |
|---|---|---|---|---|
| 1,053,917 A * | 2/1913 | Luce | .............................. | 460/126 |
| 1,538,662 A * | 5/1925 | Schofield | ...................... | 131/314 |
| 2,468,276 A * | 4/1949 | Sorenson | ........................ | 171/22 |
| 2,641,888 A * | 6/1953 | Grether | ........................... | 56/13.5 |
| 2,731,782 A * | 1/1956 | Mason | ............................ | 56/11.9 |
| 2,816,411 A * | 12/1957 | Wilson | ............................ | 56/27.5 |
| 2,834,174 A * | 5/1958 | Suggs et al. | .................... | 56/27.5 |
| 3,093,949 A * | 6/1963 | Splinter | ......................... | 56/27.5 |
| 3,344,591 A * | 10/1967 | Christie et al. | .................. | 56/330 |
| 3,406,506 A * | 10/1968 | Shriver et al. | .................. | 56/27.5 |

(Continued)

FOREIGN PATENT DOCUMENTS

EP    0 502 789 A1    9/1992

OTHER PUBLICATIONS

The Netherlands Search Report issued Jun. 29, 2010, in The Netherlands 1037503, filed Nov. 26, 2009 (with English Translation of Category of Cited Documents).

*Primary Examiner* — Thomas Will
*Assistant Examiner* — Mai Nguyen
(74) *Attorney, Agent, or Firm* — Oblon, Spivak, McClelland, Maier & Neustadt, L.L.P.

(57) ABSTRACT

The invention relates to a device for stripping leaves from heading plants grown in rows. The device, which is movable in a direction of movement, comprises at least two rotary shafts, on which leaf strippers extending substantially transversely to the shafts are provided. The shafts extend substantially in the direction of movement of the device, such that leaves that grow under a head are removable from a stalk of a plant, in particular broccoli and cauliflower, between the shafts by the leaf strippers. The shafts, which lie in a virtual plane, include an angle between each other, such that front ends of the shafts are spaced further apart than rear ends of the shafts. The leaf strippers are finger-like projections, and the finger-like projections located near the front ends of the shafts are longer than the finger-like projections located near the rear ends of the shafts.

9 Claims, 2 Drawing Sheets

U.S. PATENT DOCUMENTS

| | | |
|---|---|---|
| 3,485,023 A | 12/1969 | See |
| 3,513,650 A * | 5/1970 | Porter .............................. 56/234 |
| 3,524,308 A * | 8/1970 | Spry ................................. 56/51 |
| 3,589,117 A * | 6/1971 | Wadsworth ..................... 56/247 |
| 3,601,959 A * | 8/1971 | Pinkham ....................... 56/17.5 |
| 3,690,049 A | 9/1972 | Roberson |
| 3,827,219 A * | 8/1974 | Ackerman ........................ 56/53 |
| 3,830,048 A * | 8/1974 | Ervin .............................. 56/331 |
| 3,858,660 A * | 1/1975 | Wadsworth ..................... 171/57 |
| 3,992,860 A * | 11/1976 | Bobbitt, Jr. ..................... 56/27.5 |
| 4,149,544 A * | 4/1979 | Baraut .......................... 460/134 |
| 4,192,124 A * | 3/1980 | Balthes ......................... 56/27.5 |
| 4,301,646 A | 11/1981 | Gates et al. |
| 4,354,340 A * | 10/1982 | Huggins et al. ................ 56/27.5 |
| 4,507,911 A * | 4/1985 | Wolf et al. .................... 56/327.1 |

* cited by examiner

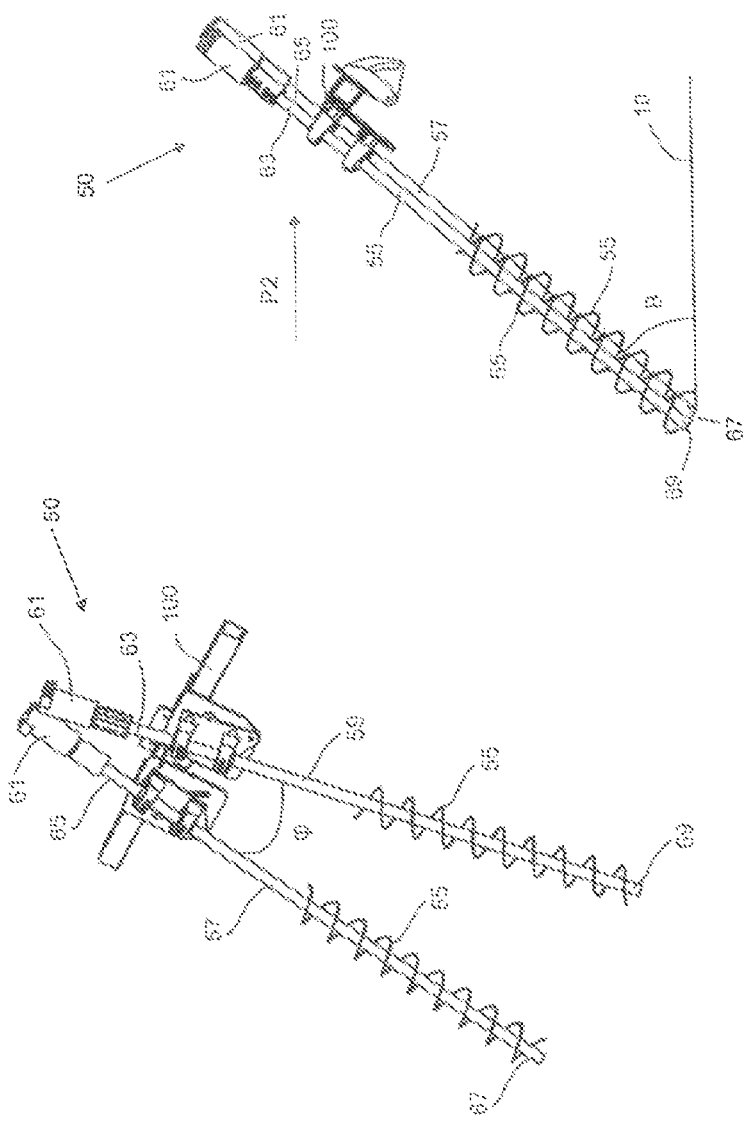

DEVICE FOR STRIPPING THE LEAVES FROM HEADING PLANTS GROWN IN ROWS

The invention relates to a device for stripping the leaves from heading plants grown in rows, which device, which is movable in a direction of movement, comprises at least two rotary shafts, on which leaf stripping means extending substantially transversely to said shafts are provided.

The invention further relates to a mobile unit.

Such a device as well as a mobile unit are known from U.S. Pat. No. 4,301,646. Said US patent describes an apparatus for defoliating plants. The known device is suitable only for defoliating plants of which the parts to be harvested grow in the ground. The fact is that with crops of this kind the part of the plant that grows above the ground can be removed in its entirety.

A drawback of the known device is that it is not suitable for harvesting crops whose economically valuable parts grow above the ground rather than in the ground.

Accordingly it is an object of the present invention to provide a device by means of which the aboveground, practically valueless parts of heading crops, viz. the leaves, can be separated from the aboveground, economically valuable parts, viz. the head, in a continuous process in the field.

This object is accomplished with the device according to the present invention in that said shafts extend substantially in the direction of movement of the device, such that the leaves that grow under a head can be removed from a stalk of a plant, such as in particular broccoli and cauliflower, between said shafts by the leaf stripping means.

The advantage of the device according to the present invention is that it strips the leaves from the heading plants, thereby uncovering the heads of the plants. Said heads can then be harvested more easily in a subsequent operation. Moreover, the harvested heads comprise less undesirable parts in the form of leaves. It is necessary, however, for the plants to be planted in a substantially straight line or, in other words, in a row, so that the economically most valuable parts of the plants, viz. the heads, are more or less aligned relative to each other. By having the shafts rotate at a high speed on either side of the row, the leaves will be removed at least in part by the leaf stripping means, so that the head is at least partially uncovered for being harvested.

A special embodiment of the device according to the present invention is characterised in that the shafts, which lie in a virtual plane, include an angle with each other, such that the front ends of the shafts are spaced further apart than the rear ends of the shafts.

As a result of this funnel-shaped or partially V-shaped arrangement of the shafts, the economically valuable head, or rather the stalk, is slowly centred between the shafts, so that the leaves can be adequately removed from the stalk. Moreover, because of the funnel-shaped arrangement, jamming of the shafts will not easily occur in use. The angle between the shafts that determines the V shape can be adjusted in dependence on the circumstances before the device is put to use.

In this document, the terms "front" and "rear" are used in relation to the direction of movement, in which connection the front end is distinguished from the rear end in that the front end, seen in the direction of movement, will reach a particular point sooner than the rear end.

Another embodiment of the device according to the present invention is characterised in that the front ends of the shafts are positioned higher than the rear ends of the shafts.

In this way longer leaf stripping means can be used near the front ends, without said leaf stripping means coming into contact with the ground.

Another embodiment of the device according to the present invention is characterised in that the leaf stripping means are finger-like projections.

Such finger-like projections are flexible, they are rotated at such a high speed that the leaves can be struck or cut from the stalk therewith.

Preferably, the finger-like projections located near the front ends of the shafts are longer than the finger-like projections located near the rear ends of the shafts, so that the working range of the former projections will be largest in the widest area between the shafts, so that the larger leaves will be struck or cut off first by the longer projections. As the device moves further ahead, the shafts will be centred more relative to the stalk, so that at least those parts of the leaves that are located near the stalk, which is correctly centred between the shafts, can be removed by means of the shorter projections. In this way the leaves are stripped from the plants in steps.

Yet another embodiment of the device according to the present invention is characterised in that the shafts are connected to each other via a frame, by means of which frame the angle between the shafts as well as the angle of the virtual plane of the shafts relative to the horizontal can be adjusted.

The shafts can be adjusted in dependence on the circumstances by means of the frame, which is provided with several driving mechanisms which are known per se.

The invention finally relates to a mobile unit. Such a unit is provided with wheels, for example, and with coupling means via which the unit can be coupled to a tractor or the like.

One embodiment of the mobile unit according to the present invention is characterised in that a leaf positioning device is provided ahead of the device for stripping the leaves from heading plants grown in rows, which leaf positioning device comprises two rotary positioning shafts extending at an angle in a virtual plane, on which positioning shafts leaf positioning means are provided for positioning the leaves of the plant to within the working range of the device for stripping the leaves from heading plants grown in rows.

In order to have the stripping of the plants take place in an effective manner, the leaves first need to be moved. The leaf positioning device ensures that the leaves, also the leaves present at the front side and at the rear side of the plant, are temporarily engaged by the positioning means and positioned so that they can be struck or cut off by means of the leaf stripping device.

Another embodiment of the mobile unit according to the present invention is characterised in that the leaf positioning means are formed by coils.

The three-dimensional coils are driven by the rotation of the positioning shafts, being capable of temporarily clamping leaves between their windings and carrying said leaves along to a position where they can be cut off by means of the leaf stripping device. Such coils are relatively easy to produce and that at low cost, whilst their effectiveness is relatively high.

Yet another embodiment of the mobile unit according to the present invention is characterised in that the positioning shafts are connected to each other via a frame, by means of which frame the angle between the positioning shafts as well as the angle of the virtual plane of the positioning shafts relative to the horizontal can be adjusted.

Preferably, the front ends of the positioning shafts are positioned higher than the rear ends of the positioning shafts, the rear ends of which positioning shafts being located near the front ends of the shafts of the device for stripping the leaves from heading plants grown in rows.

Because of this arrangement of the positioning device relative to the leaf stripping device, the leaves can be engaged at a relatively high position by the leaf positioning device and subsequently be carried downwards in the direction of the shafts of the leaf stripping device. At the leaf stripping device, the leaves are separated from the heading plants in an efficient manner without causing any damage to the aboveground head.

The angle of the positioning shafts relative to the horizontal can be set in dependence on the field, further circumstances and the condition or the type of the plants to be harvested, for example cauliflower or broccoli.

The invention will now be explained in more detail with reference to an embodiment shown in the drawings, in which.

Figures 1, 2:
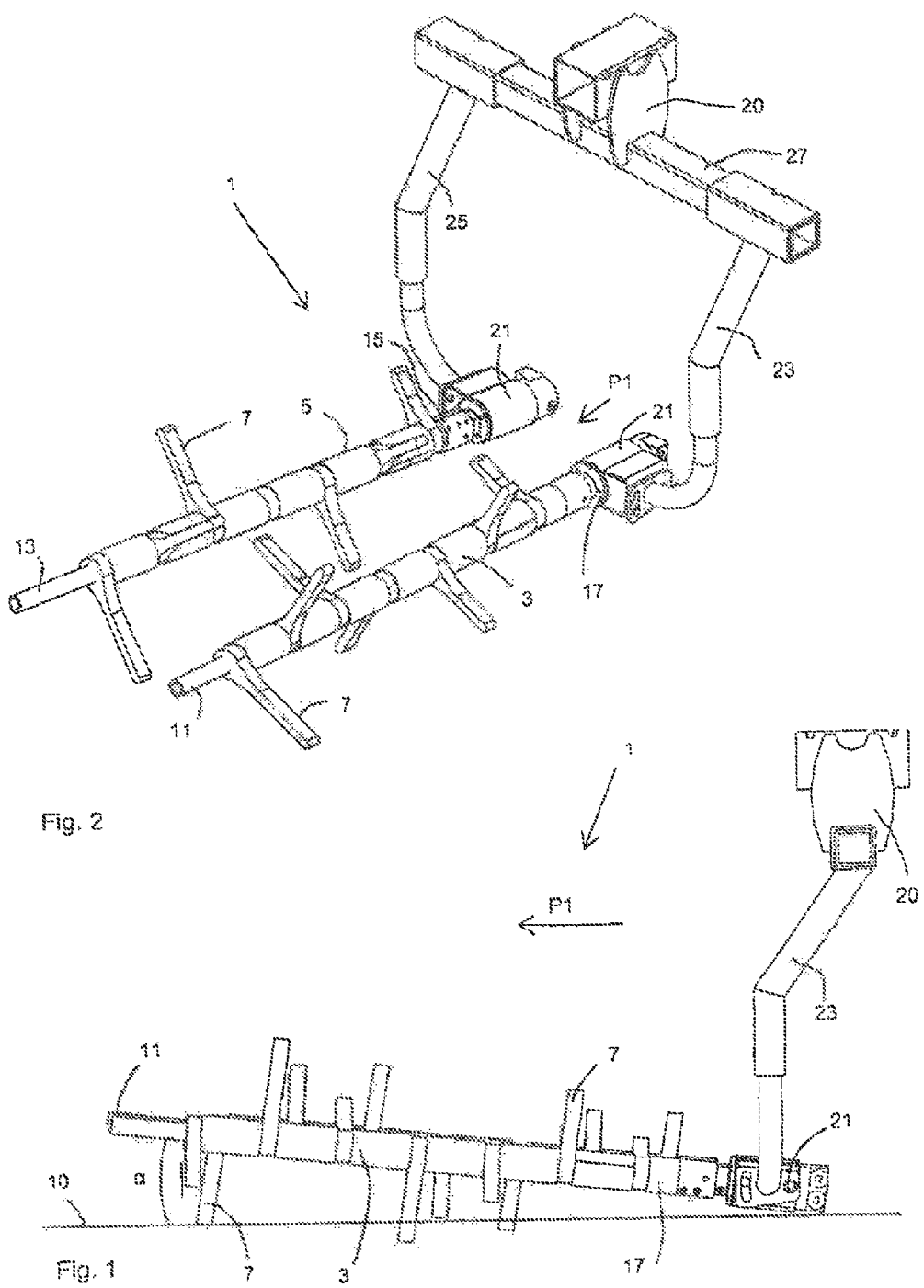
FIG. 1 is a side view of a device according to the present invention for stripping the leaves from heading plants grown in rows.
FIG. 2 is a perspective view of the device according to the present invention shown in FIG. 1.

FIGS. 3a-c show views of the leaf positioning device according to the present invention.

Like figures are indicated by the same numerals in the figures.

FIG. 1 shows a device 1 according to the present invention for stripping the leaves from heading plants grown in rows. The present invention is in particular suitable for removing the leaves from the stalks of broccoli and cauliflower plants for the purpose of uncovering the head, so that said head can be harvested more efficiently. The plants are grown in rows, for example in a bed, such that the plants to be stripped extend in a substantially straight line.

The device 1, which is movable in a direction of movement P1, is provided with at least two rotary shafts 3, 5, on which leaf stripping means in the form of flexible, finger-like projections 7 are provided, which leaf stripping means extend substantially transversely to the shafts 3, 5. For stripping the heading plants, the direction of movement P1 will extend substantially parallel to the straight line formed by the row or the bed in which the plants are grown.

The shafts 3, 5 extend substantially in the direction of movement P1 of the device 1, such that the leaves that grow under a head can be removed from a stalk of a plant (not shown), such as in particular broccoli and cauliflower, by means of the projections 7 between said shafts 3, 5. The spacing between the shafts 3, 5 is set so that a central zone is created which cannot be reached by the rotating projections 7 in use, so that the stalk of the plant will not be cut through.

In FIG. 1 the shafts 3, 5 are shown to be located in a virtual plane, with the shafts including an angle $\alpha$ with the (virtual) horizontal 10. As a result of said angle, the first projections 7 located near a front end 11, 13 of the shafts 3, 5 can be longer than the projections 7 located near the rear end 15, 17, since the distance to the ground is greater at the front ends 11, 13 of the shafts 3, 5 than at the rear ends 15, 17 of the shafts 3, 5. Said angle $\alpha$ is adjustable.

In FIG. 2 the shafts 3, 5 extend in a V-shape relative to each other, seen in top plan view, in such a manner that the front ends 11, 13 of the shafts 3, 5 are spaced further apart than the rear ends 15, 17 of the shafts 3, 5. In this way a funnel shape is provided by means of the shafts 3, 5, so that jamming of the shafts 3, 5 during operation will occur less often. As a result of said funnel-shaped arrangement of the shafts 3, 5, the stalk will be centred relative to the shafts 3, 5, because the V-shape moves in the driving direction and the plant is guided/forced into said V-shape. The angle between the shafts 3, 5 can likewise be adjusted in advance.

The shafts 3, 5 are connected via a frame 20. The frame 20 comprises driving mechanisms 21 for rotating the shafts 3, 5, which driving mechanisms are known per se. The frame 20 further comprises two legs 23, 25 which are movable relative to each other, which legs are connected to each other by a bridge member 27 of the frame 20. The legs 23, 25 are slidably connected to the bridge member 27, in such a manner as to make it possible to adjust the spacing between the shafts 3, 5. It is furthermore possible to adjust the angle between the shafts 3, 5 extending in a V-shape relative to each other as well as the angle $\alpha$ of the virtual plane of the shafts 3, 5 relative to the horizontal 10 by means of several adjusting mechanisms that are known per se.

FIGS. 3a-c show a leaf positioning device 50 which functions to enable the above-described device 2 to strip the plants in an effective manner. The leaves, in particular the leaves at the front and the rear side of the plant, are moved to within the working range of the leaf stripping device 1 by means of said leaf positioning device 50. The leaf positioning device 50 enables the positioning means in the form of coils 55 to engage and position the leaves so that they can be cut off by the leaf stripping device 1.

The leaf positioning device 50 comprises two rotary positioning shafts 57, 59 extending at an angle $\beta$ in a virtual plane, on which positioning shafts 57, 59 the coils 55 are provided. The positioning shafts 57, 59 include an angle $\beta$ of 50 degrees with the horizontal 10. Said angle $\beta$ with the horizontal can be varied. As is shown in FIG. 3c, the front ends 63, 65 of the positioning shafts 57, 59 are positioned higher than the rear ends 67, 69 of the positioning shafts 57, 59. In the representation of the leaf positioning device 50 shown in FIG. 3, the direction of movement, which is indicated by the arrow P2 in FIG. 3c, is the opposite of the direction indicated by the arrow P1.

The positioning shafts 57, 59 are connected to each other via a frame 100, whilst the angle between the positioning shafts 57, 59 as well as the angle between the virtual plane of the positioning shafts 57, 59 and the horizontal 10 can be adjusted by means of the adjusting mechanism provided on the frame 100. Adapting said angles may be necessary, for example, in the case of changing circumstances on the field.

Driving mechanisms 61 mounted to the positioning shafts 57, 59 are used for rotating the positioning shafts 57, 59, resulting in leaves being engaged by means of the coil 55 and being carried in the direction of the working range of the leaf stripping device 1.

The leaf positioning device 50 will be positioned near the front ends 11, 13 of the shafts 3, 5 of the leaf stripping device 1. If the leaf positioning device 50 shown in FIGS. 3a-c is positioned ahead of the leaf stripping device 1 shown in FIG. 1, it will be necessary to reverse one of said devices. The fact is that the rear ends 67, 69 of the shafts 57, 59 of the positioning device 50 must be positioned near the front ends 11, 13 of the shafts 3, 5 of the leaf stripping device 1.

As a rule, the leaf positioning device 50 will be combined with the leaf stripping device 1 in a mobile unit (not shown). The frame 100 of the leaf positioning device 50 will in that case be connected to the frame 20 of the leaf stripping device 1 via the chassis of said unit.

It is also possible, of course, to use other leaf stripping means than the illustrated projections 7 for cutting or striking loose the leaves. The same goes for the coil 55, instead of which also other leaf positioning means may be used.

The invention claimed is:

1. A device for stripping leaves from heading plants grown in rows, the device, which is movable in a direction of movement, comprises:

at least two rotary shafts, on which leaf strippers extending substantially transversely to said shafts are provided, wherein said shafts extend substantially in the direction of movement of the device, such that leaves that grow under a head are removable from a stalk of a plant, in particular broccoli and cauliflower, between said shafts by the leaf strippers, said shafts, which lie in a virtual plane, include an angle between each other, such that front ends of the shafts are spaced further apart than rear ends of the shafts, and wherein said leaf strippers are finger-like projections, and the finger-like projections located near the front ends of the shafts are longer than the finger-like projections located near the rear ends of the shafts.

2. A device according to claim 1, wherein the front ends of the shafts are positioned higher than the rear ends of the shafts.

3. A device according to anyone of the preceding claims, wherein the shafts are connected to each other via a frame, and by means of the frame the angle between the shafts as well as an angle of the virtual plane of the shafts relative to the horizontal are adjustable.

4. A device according to claim 1, further comprising:
a leaf positioning device that includes two rotary positioning shafts extending at an angle in a virtual plane, and on the positioning shafts leaf positioners are provided for positioning the leaves of the plant to within a working range of the device for stripping the leaves from heading plants grown in rows.

5. A device according to claim 4, wherein the leaf positioners are formed by coils.

6. A device according to claim 4, wherein the positioning shafts are connected to each other via a frame, and by means of the frame the angle between the positioning shafts as well as an angle of the virtual plane of the positioning shafts relative to the horizontal are adjustable.

7. A device according to claim 4, wherein the front ends of the positioning shafts are positioned higher than the rear ends of the positioning shafts, the rear ends of the positioning shafts being located near the front ends of the shafts of the device for stripping the leaves from heading plants grown in rows.

8. A device for stripping leaves from heading plants grown in rows, the device, which is movable in a direction of movement, comprises:
at least two rotary shafts, on which means for leaf stripping that extend substantially transversely to said shafts are provided, wherein said shafts extend substantially in the direction of movement of the device, such that leaves that grow under a head are removable from a stalk of a plant, in particular broccoli and cauliflower, between said shafts by the leaf stripping means, said shafts, which lie in a virtual plane, include an angle between each other, such that front ends of the shafts are spaced further apart than rear ends of the shafts, and wherein said leaf stripping means include finger-like projections, and the finger-like projections located near the front ends of the shafts are longer than the finger-like projections located near the rear ends of the shafts.

9. A device according to claim 1, further comprising:
a leaf positioning device that includes two rotary positioning shafts extending at an angle in a virtual plane, and on the positioning shafts means for leaf positioning are provided for positioning the leaves of the plant to within a working range of the device for stripping the leaves from heading plants grown in rows.

* * * * *